United States Patent

Adia et al.

[11] Patent Number: 6,149,695
[45] Date of Patent: Nov. 21, 2000

[54] ABRASIVE BODY

[76] Inventors: Moosa Mahomed Adia, 8 Nagel Street, Lakefield, Benoni; Hendrik Jacobus Van Jaarsveldt, 16 Deysel Avenue, Strubenvale, Springs, both of South Africa

[21] Appl. No.: 09/264,007

[22] Filed: Mar. 8, 1999

[30] Foreign Application Priority Data

Mar. 9, 1998 [ZA] South Africa .................. 98/1969

[51] Int. Cl.[7] .................. B24D 3/00; B24D 3/04; B24D 5/00; B24D 17/00
[52] U.S. Cl. .................. 51/307; 51/293; 51/309; 407/119
[58] Field of Search .................. 51/293, 309, 295, 51/307; 407/119; 125/39

[56] References Cited

U.S. PATENT DOCUMENTS

| | | |
|---|---|---|
| 5,007,207 | 4/1991 | Phaal . |
| 5,120,327 | 6/1992 | Dennis .................. 51/293 |
| 5,355,969 | 10/1994 | Hardy et al. .................. 175/432 |
| 5,435,403 | 7/1995 | Tibbitts . |
| 5,472,376 | 12/1995 | Olmstead et al. . |
| 5,590,727 | 1/1997 | Tank et al. . |
| 5,685,769 | 11/1997 | Adia et al. . |

*Primary Examiner*—Michael Marcheschi
*Attorney, Agent, or Firm*—Oblon, Spivak, McClelland, Maier & Neustadt, P.C.

[57] ABSTRACT

An abrasive body, particularly a tool insert, comprises an abrasive layer bonded to a substrate along an interface. The abrasive layer extends into the substrate to a depth below the interface at the periphery of the body and defines a continuous border around the periphery of the body. The abrasive body is further provided with one or more projections which extend from the interface into one of the layers. If the projection extends into the abrasive layer it is of the same material as the substrate and integral therewith. If the projection extends into the substrate layer, it is the same abrasive as the abrasive layer and integral therewith.

12 Claims, 5 Drawing Sheets

ABRASIVE BODY

BACKGROUND OF THE INVENTION

This invention relates to an abrasive body and more particularly to an abrasive body which can be used as a tool insert.

Composite abrasive compacts are products used extensively as inserts for abrasive tools such as drills. Such composite abrasive compacts comprise an abrasive compact layer bonded to a cemented carbide support. The abrasive compact will typically be a diamond abrasive compact, also known as polycrystalline diamond or PCD, or a cubic boron nitride compact, also known as polycrystalline CBN or PCBN.

Composite abrasive compacts are manufactured under elevated temperature and pressure conditions, e.g. diamond or cubic boron nitride synthesis conditions.

It is known that PCD composite compacts contain considerable residual stresses as a result of the high temperature/high pressure conditions used in their manufacture. Further, methods of mounting such compacts into drill bits, for example press fitting or brazing, can modify the stress distributions in the compacts. Additional stresses are imposed on the compacts during their use in application such as drilling. Stresses may be introduced into the interface between the abrasive compact layer and the cemented carbide support. These stresses may be reduced or modified by providing a recess which extends into the cemented carbide support from the compact/carbide interface and which is filled with the abrasive compact. In the prior art, the recess has taken various shapes such as a plurality of concentric rings, a V-shaped recess, a cross-shaped recess, and a recess which incorporates a number of steps. The purpose in all such designs is to reinforce and support the cutting edge by providing overall rigidity for the composite compacts.

SUMMARY OF THE INVENTION

According to the present invention, there is provided an abrasive body, particularly a tool insert, comprises an abrasive layer bonded to a substrate layer along an interface, the abrasive layer extending into the substrate to a depth below the interface at the periphery of the body and defining a continuous border around the periphery of the body, and one or more projections extending from the interface into one of the layers:

(i) if the projection extends into the abrasive layer, it is of the same material as the substrate and integral therewith; and (ii) if the projection extends into the substrate layer, it is of the same abrasive as the abrasive layer and integral therewith.

In one preferred form of the invention, there at least two projections which are crescent-shaped.

According to another preferred form of the invention, there are at least two projections spaced from each other on opposite sides of an imaginary centre line through the abrasive body. These projections may be crescent-shaped. When they are crescent-shaped, they are preferably concentric.

According to another preferred form of the invention, there are one or more ring-shaped projections. When there are at least two ring-shaped projections, they are preferably concentric.

The abrasive body preferably also includes an elongate projection which extends substantially across the body from one edge of the body to an opposite edge of the body. This projection may be the only projection or in addition to other projections. The elongate projection will be defined by sides which are preferably parallel. These sides may slope from the interface to a base surface of the projection.

The elongate projection, when provided, preferably extends from the interface into the substrate layer. The elongate projection may extend from the interface into the substrate layer to a depth greater than that of the continuous border.

When ring or crescent-shaped projections are provided in addition to the elongate projection, and all such projections extend from the interface into the substrate layer, the elongate projection will typically extend a depth greater than that of the crescent-shaped projections and ring-shaped projections and also the continuous border.

The abrasive body will preferably be circular in plan.

The substrate layer will typically be a cemented carbide substrate layer. The cemented carbide for the substrate may be any known in the art such as cemented titanium carbide, cemented tungsten carbide, cemented tantalum carbide, cemented molybdenum carbide, or mixtures thereof. As is known, such cemented carbides will typically have a metal binder content of 3 to 30 percent by mass. The metal binder will typically be cobalt, iron or nickel or an alloy containing one or more of these metals.

The abrasive layer will generally be an abrasive compact layer or a layer of diamond produced by chemical vapour deposition (CVD). When the abrasive layer is an abrasive compact layer, it will preferably be a diamond compact layer or a cubic boron nitride compact layer.

DESCRIPTION OF EMBODIMENTS

Figure 1:
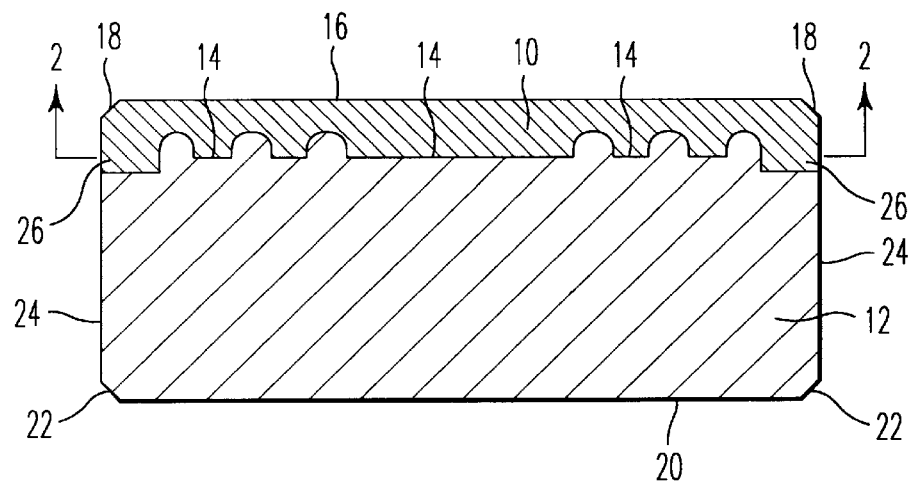
FIG. 1 is a sectional side view of a first embodiment of the invention.
Figure 2:
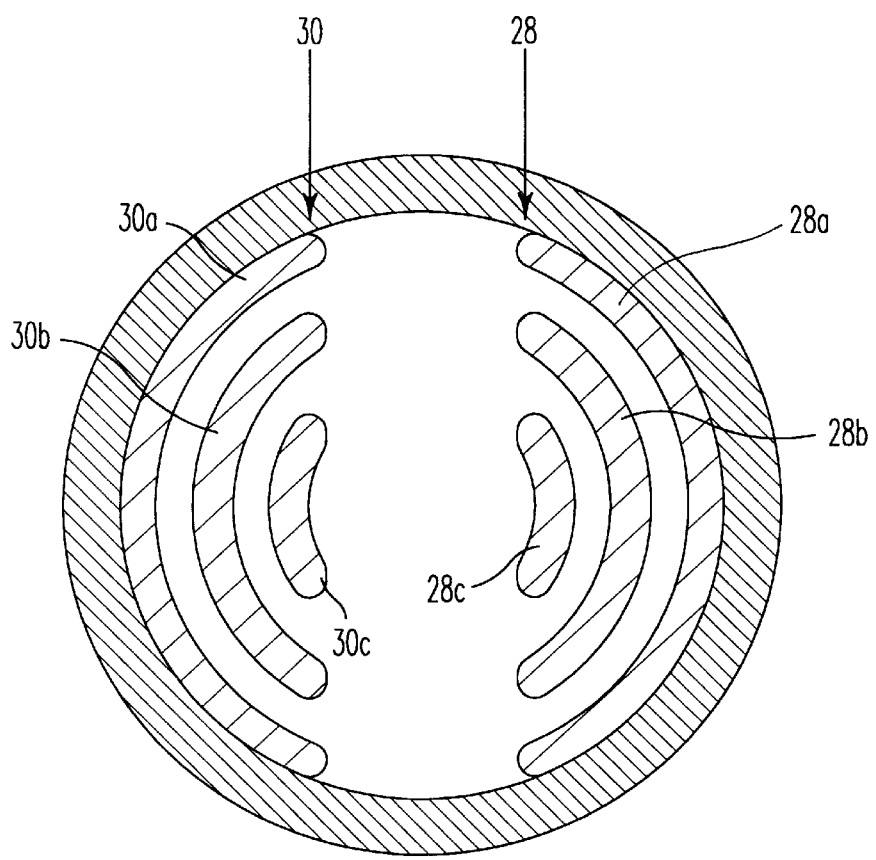
FIG. 2 is a section along the line 2—2 of FIG. 1.

A first embodiment of the invention will now be described with reference to FIGS. 1 and 2. Referring to these figures, an abrasive body is shown which has particular application as a tool insert for a drill. The abrasive body comprises a layer 10 of abrasive compact bonded to a cemented carbide substrate 12 along an interface 14. The abrasive compact layer has an upper working surface 16 which has bevelled cutting edge 18. The bevelled cutting edge extends around the entire periphery of the surface 16. The substrate layer 12 has a flat base surface 20, the edge 22 of which is also bevelled.

The abrasive compact layer 10 extends below the interface 14 at the periphery 24 of the body defining a ring 26 of abrasive compact. This ring 26 extends around the entire periphery 24 of the abrasive body.

Extending into the abrasive compact layer 10 are two sets 28, 30 of projections from the substrate 12. Each set of projections comprises three crescent-shaped concentric projections identified as 28a, 28b, 28c and 30a, 30b, and 30c, respectively. The projections vary in size with the smallest 28c, 30c being the innermost and the largest 28a, 30a being the outermost. Further, each projection has rounded ends, as illustrated.

Figure 3:
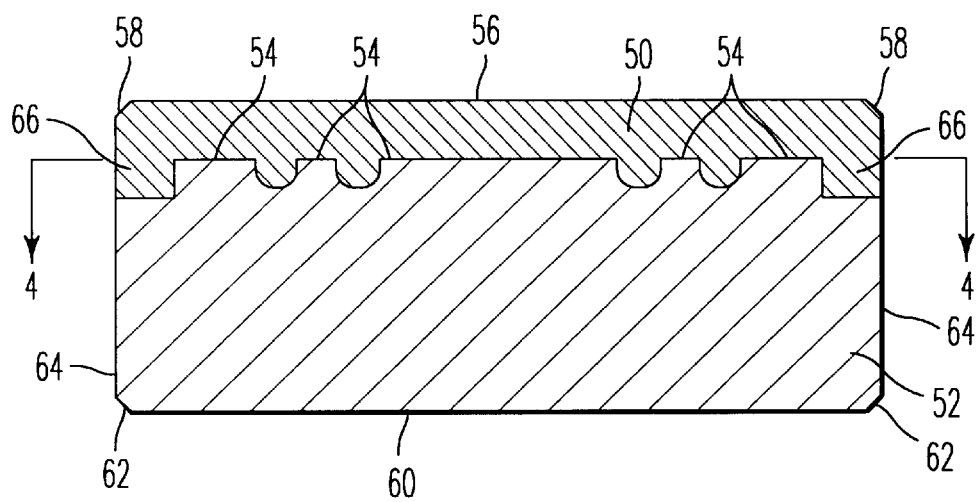
FIG. 3 is a sectional side view of a second embodiment of the invention.
Figure 4:
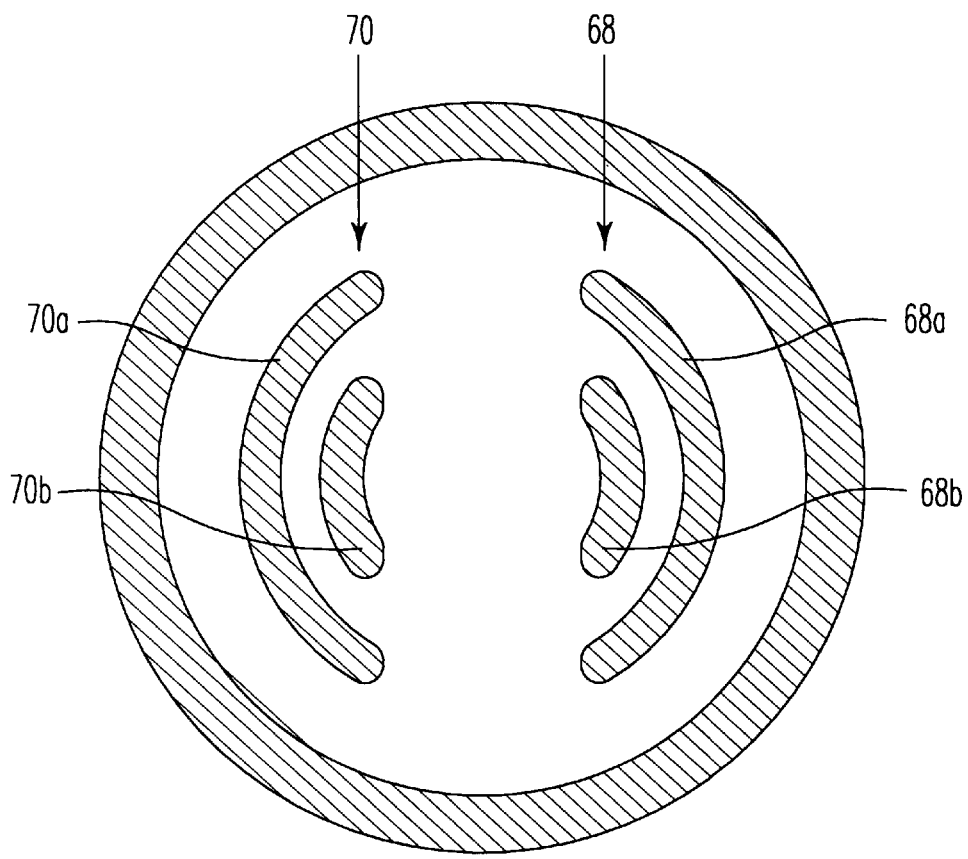
FIG. 4 is a section along the line 4—4 of FIG. 3.

A second embodiment of the invention is illustrated by FIGS. 3 and 4. Referring to these figures, an abrasive body is shown which also has application as a tool insert for a drill. The abrasive body comprises a layer 50 of abrasive compact bonded to a cemented carbide substrate 52 along an interface 54. The abrasive compact layer has an upper working surface 56 which has a bevelled cutting 58. The bevelled cutting edge extends around the entire periphery of the surface 56. The substrate layer 52 has a flat base surface 60, the edge 62 of which is also bevelled.

The abrasive compact layer 50 extends below the interface 54 at the periphery 64 of the body defining a ring 66 of abrasive compact. This ring 66 extends around the entire periphery 64 of the abrasive body.

Extending into the substrate 52 are two sets 68, 70 of projections from the abrasive compact layer 50. Each set of projections comprises two crescent-shaped concentric projections identified a 68a, 68b and 70a, 70b, respectively. The projections vary in size with the smaller projections 68b, 70b being located inside the larger projections 68a, 70a. Further, each projection has rounded ends, as illustrated.

Figure 5:
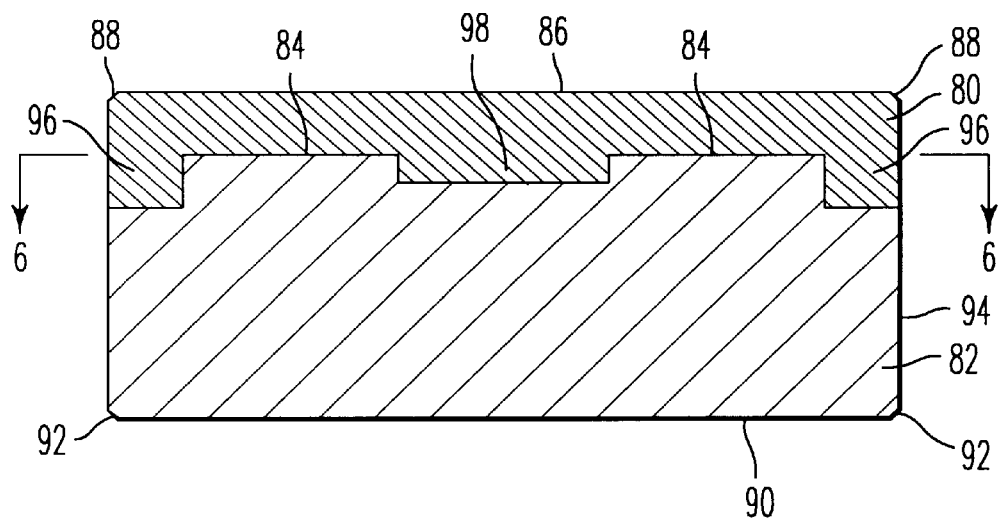
FIG. 5 is a sectional side view of a third embodiment of the invention.
Figure 6:
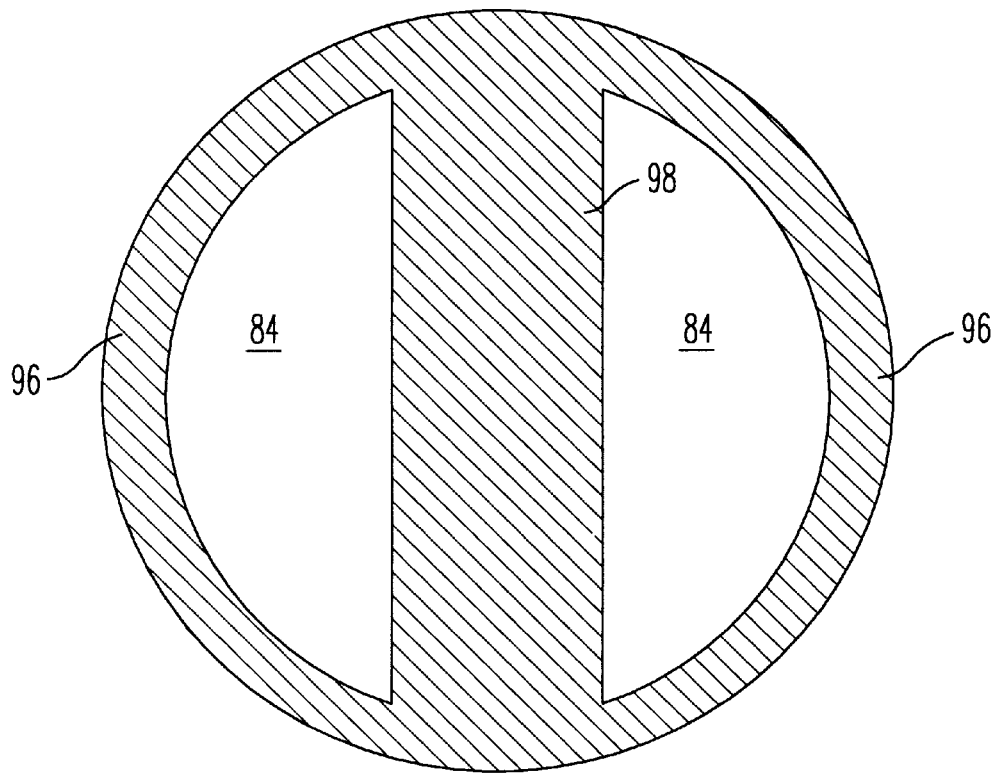
FIG. 6 is a section along the line 6—6 of FIG. 5.

A third embodiment of the invention is illustrated by FIGS. 5 and 6. The abrasive body shown in FIGS. 5 and 6 also has application as a tool insert for a drill. The abrasive body comprises a layer 80 of abrasive compact bonded to a cemented carbide substrate 82 along an interface 84. The abrasive compact layer has an upper working surface 86 which has a bevelled cutting edge 88. The bevelled cutting edge extends around the entire periphery of the surface 86. The substrate layer 82 has a flat base surface 90, the edge 92 of which is also bevelled.

The abrasive compact layer 80 extends below the interface 84 at the periphery 94 of the body defining a ring 96 of abrasive compact. This ring 96 extends around the entire periphery 94 of the abrasive body.

Extending into the substrate 82 from the interface 84 is a single elongate projection 98 from the abrasive compact layer 80. The projection extends from one side of the ring 96 to the opposite side and takes essentially the form of a bar. Further, the projection 98 is centrally located and extends into the substrate 82 to a depth less than that of the ring 96. In an alternative embodiment, not illustrated, the projection 98 extends to a depth equal to or greater than that of the ring 96.

In the embodiment illustrated by FIGS. 5 and 6, the single elongate projection 98 may take other forms such as a "V" or "X" as described and illustrated in EP 659,510. The "V" or "X" projection will generally extend from one side of the ring 96 to the opposite side.

Figure 7:
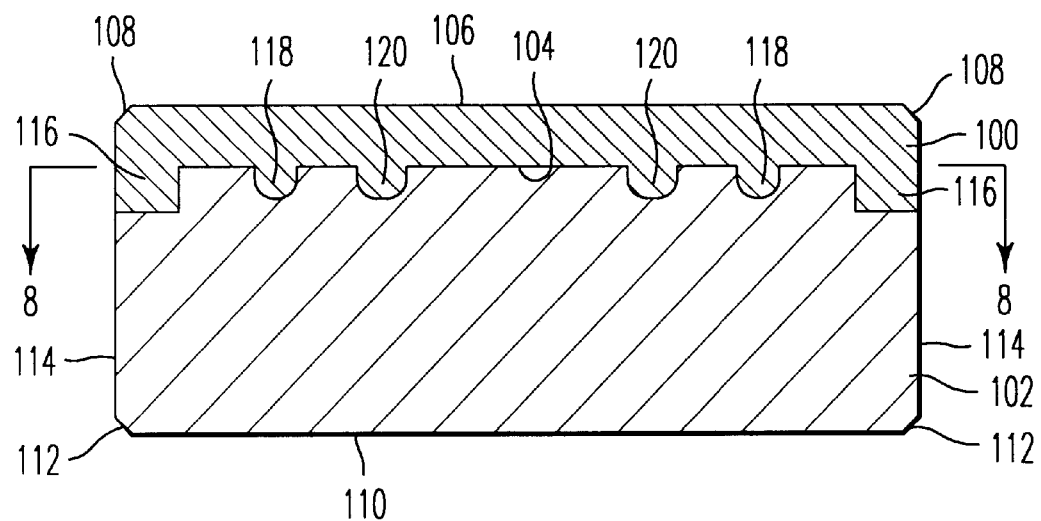
FIG. 7 is a sectional side view of a fourth embodiment of the invention.
Figure 8:
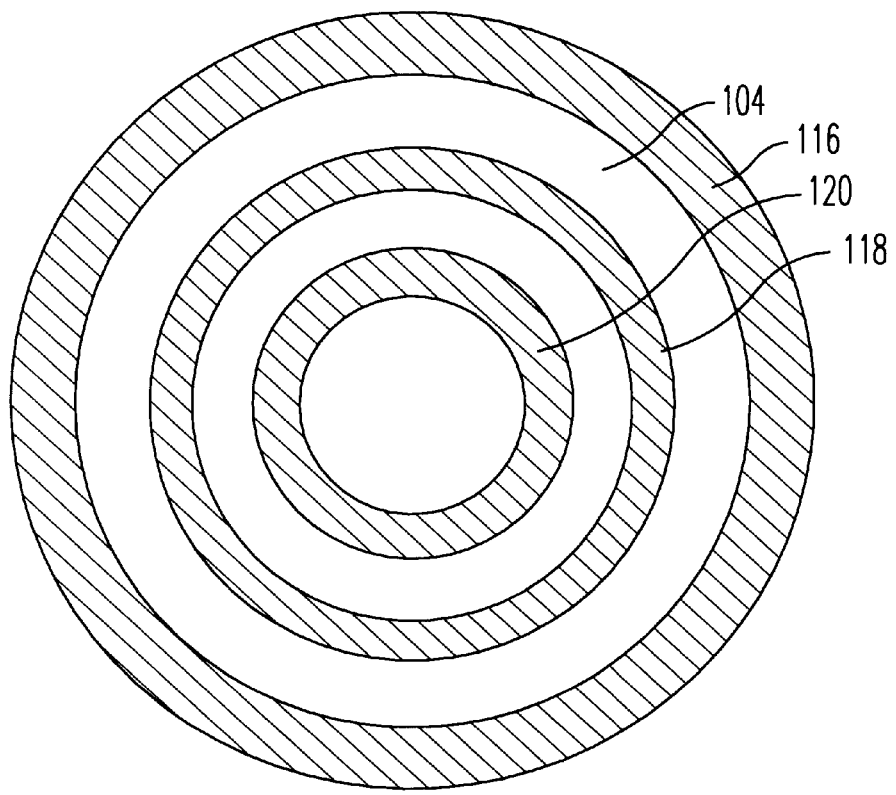
FIG. 8 is a section along the line 8—8 of FIG. 7.

A fourth embodiment of the invention is illustrated by FIGS. 7 and 8. As with the previous embodiments, the abrasive body illustrated by FIGS. 7 and 8 has application as an insert for a drill. The abrasive body comprises a layer 100 of abrasive compact bonded to a cemented carbide substrate 102 along an interface 104. The abrasive compact layer has an upper working surface 106 which has a bevelled cutting edge 108. The bevelled cutting edge extends around the entire periphery of the surface 106. The substrate layer 102 has a flat base surface 110, the edge 112 of which is also bevelled.

The abrasive compact layer 100 extends below the interface 104 at the periphery 114 of the body defining a ring 116 of abrasive compact. This ring 116 extends around the entire periphery 114 of the abrasive body.

Extending into the substrate 102 are two concentric ring-shaped projections 118, 120 from the abrasive compact layer 100. The ring-shaped projections extend into the substrate to a depth less than that of the ring 116.

In the embodiment illustrated by FIGS. 7 and 8, the concentric ring-shaped projections extend into the substrate. In an alternative form of this embodiment, not illustrated, projections of cemented carbide substrate extend from the interface 104 into the abrasive compact layer 100.

In the embodiments illustrated in FIGS. 1 to 8, the walls or surfaces defining the projections are curved or straight. These can vary from those illustrated. For example, in all of the embodiments, the crescent-shaped and ring-shaped projections are illustrated as having curved defining surfaces. These surfaces may also be straight or sloping with corners between adjacent surfaces. Further, the straight-sided surfaces of the projection 98 in the embodiment of FIGS. 5 and 6 may also be sloped.

Figure 9:
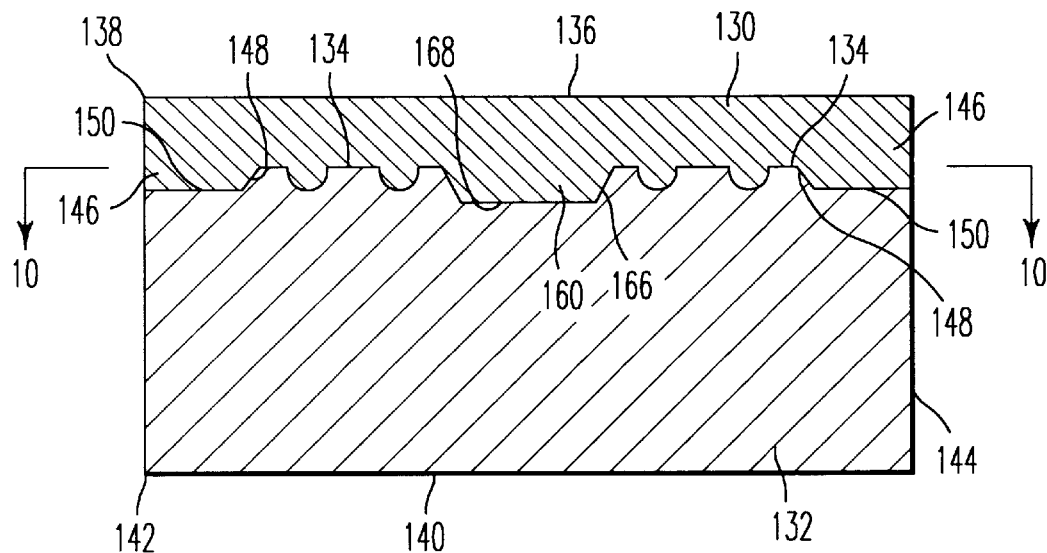
FIG. 9 is a sectional side view of a fifth embodiment of the invention.
Figure 10:
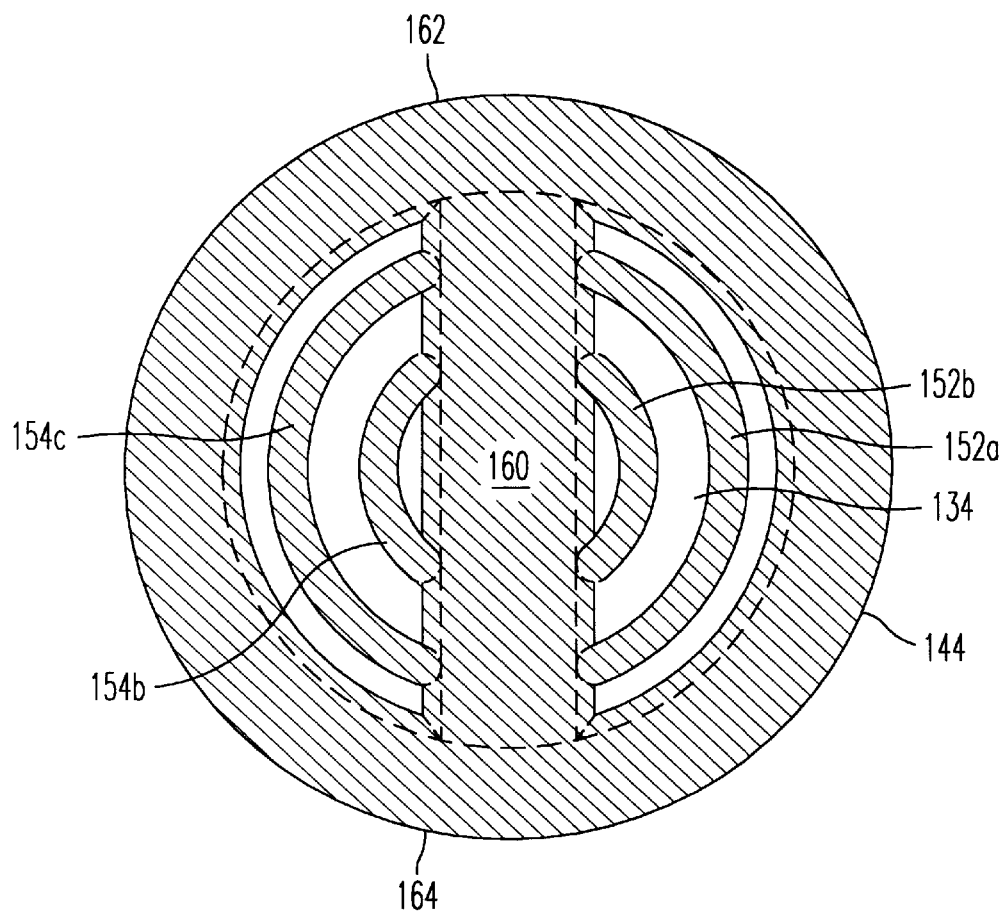
FIG. 10 is a section along the line 10—10 of FIG. 9.

A further embodiment of the invention is illustrated by FIGS. 9 and 10. As with the previous embodiments, the abrasive body of this embodiment also has application, in particular, as an insert for a drill. The abrasive body comprises a layer 130 of abrasive compact bonded to a cemented carbide substrate 132 along an interface 134. The compact layer has an upper working surface 136 which has cutting edge 138. The edge is illustrated as being a sharp edge. This edge can also be bevelled. The cutting edge 138 extends around the entire periphery of the surface 136. The substrate layer 132 has a flat base surface 140, the edge 142 of which may be sharp, as illustrated, or bevelled.

The abrasive compact layer 130 extends below the interface 134 at the periphery 144 of the body defining a ring 146 of abrasive compact. The ring 146 has a sloping side surface 148 between the interface 134 and the base surface 150 of the ring 146. The ring 146 extends around the entire periphery 144 of the abrasive body.

Extending into the substrate 132 are two crescent-shaped concentric projections identified as 152a, 152b and 154a, 154b, respectively. The smaller of the projections 152b, 154b are located inside the larger projections 152a, 154a.

A further projection 160 extends from one edge 162 to the opposite edge 164 of the abrasive body. This projection is bar-shaped and is defined by a sloping side surface 166 and a base surface 168. It will be noted that the projection 160 extends into the substrate 132 to a depth greater than that of the crescent-shaped projections 152, 154 and the ring 146.

In the embodiments described above, it has been found that the provision of a compact ring around the periphery of the body, and which is integral with the compact layer, improves the integrity of the cutting edge. Further, the compact ring in combination with the profile of the interface, particularly the projections, substantially balances and modifies residual stresses allowing the abrasive body to withstand greater imposed loads and cutting forces. The compact layer is held effectively in compression without any undue tensile stresses in the substrate.

The projections described and illustrated in FIGS. 1 to 10 may be provided with one or more steps so that the depth that they penetrate either the compact layer or the carbide layer from the interface will vary over the length of the projection.

The abrasive bodies of the invention may be made by methods known in the art. More particularly, a cemented carbide substrate will have one surface profiled to the desired shape. The components necessary to produce an abrasive compact will then be placed on the profiled surface to form an unbonded assembly and the unbonded assembly subjected to elevated conditions of temperature and pressure suitable to form an abrasive compact layer from the components.

We claim:

1. An abrasive body comprising an abrasive layer bonded to a substrate layer along an interface, the abrasive layer extending into the substrate to a depth below the interface at the periphery of the body and defining a continuous border around the periphery of the body, and one or more projections extending from the interface into one of the layers; wherein,
   (i) if the projection extends into the abrasive layer, it is of the same material as the substrate and integral therewith; and
   (ii) if the projection extends into the substrate layer, it is the same material as the abrasive layer and integral therewith and wherein the projections include a centrally located elongate projection extending from one edge of the body to an opposite edge of the body and a set of crescent-shaped projections on each side of the elongate projection.

2. An abrasive body according to claim 1 wherein the projections in the sets are concentric.

3. An abrasive body according to claim 1 wherein the elongate projection is defined by sides which are parallel.

4. An abrasive body according to claim 1 wherein the sides of the elongate projection slope from the interface to a base surface of the projection.

5. An abrasive body according to claim 1 wherein the elongate projection extends from the interface into the substrate.

6. An abrasive body according to claim 1 wherein the elongate projection extends from the interface into the substrate to a depth greater than that of the continuous border.

7. An abrasive body according to claim 1, wherein the crescent-shaped projections extend from the interface into the substrate.

8. An abrasive body according to claim 7 wherein the elongate projection extends from the interface into the substrate to a depth greater than that of both the continuous border and the crescent-shaped projections.

9. An abrasive body according to claim 1 which is circular in plan.

10. An abrasive body according to claim 1 wherein the substrate is a carbide selected from cemented titanium carbide, cemented tungsten carbide, cemented tantalum carbide, cemented molybdenum carbide or mixtures thereof.

11. An abrasive body according to claim 1 wherein the abrasive layer is an abrasive compact or a layer of CVD diamond.

12. An abrasive body according to claim 1 which is a tool insert.

* * * * *